United States Patent [19]

Dolan et al.

[11] Patent Number: 5,317,677
[45] Date of Patent: May 31, 1994

[54] MATCHING TECHNIQUE FOR CONTEXT SENSITIVE RULE APPLICATION

[75] Inventors: Charles P. Dolan, Culver City; David M. Keirsey, Aquora; Kurt Reiser, Los Angeles, all of Calif.

[73] Assignee: Hughes Aircraft Company, Los Angeles, Calif.

[21] Appl. No.: 869,402

[22] Filed: Apr. 16, 1992

[51] Int. Cl.$^5$ .............................................. G06F 15/20
[52] U.S. Cl. ........................................ 395/77; 395/10
[58] Field of Search ...................... 395/50, 51, 52, 60, 395/64, 68, 11

[56] References Cited

U.S. PATENT DOCUMENTS

| | | | |
|---|---|---|---|
| 4,847,795 | 7/1989 | Baker et al. | 395/68 |
| 4,939,680 | 7/1990 | Yoshida | 395/60 |
| 4,999,833 | 3/1991 | Lee | 395/11 |
| 5,043,915 | 8/1991 | Suwa et al. | 395/60 |
| 5,103,498 | 4/1992 | Lanier et al. | 395/68 |
| 5,119,470 | 6/1992 | Highland et al. | 395/52 |

OTHER PUBLICATIONS

Chi et al "A Generalized Case Based Reasoning System for Personnel Performance Evaluation", Proc. 24th Annual Hawaii Inter Conf on System Sciences Jan. 8–11, 1991.
Presern et al "An Adaptable Paralell Search of Knowledge Bases with Beam Search" Pra of 22nd Annual Hawaii Inter Conf on Sys Sci vol. III pp. 262–270 1989.
Rissland et al "Combining Case-Based and Rule-Based Reasoning: A Hearistic Approach " IJCAI 1989 vol. 1.
Barletta et al "Explanation Based Indexing of Case" Proceedings of AAAI-88 Aug. 1988.
Koton "Using a Case Memory to Integrate Case-Based and Causal Reasoning" Lab for Comp Sci., MIT Case--Based Reasoning Workshop Aug. 23, 1988.
Rete Network Compilation (Forgy C. L., 1982, Rete: "A Fast Algorithm for the Many Pattern/Many Object Pattern-Matching Problem" Artificial Intelligence, 19(1) 17–37.
Bareiss et al. (1989) "Supporting Start to Finish Development of Knowledge Bases", Machine Learning, vol. 4 (3/4) pp. 259–284.
Boose, J. H., & Bradshaw, J. M. (1988), Expertise transfer and complex problems: using AQUINAS as a knowledge-acquisition worksbench for knowledge--based systems, In J. Boose & B. Gaines (Eds.,), Knowledge Acquisition Tools for Expert Systems, Academic Press, pp. 39–64.
Buchanan, B. G. Barstow, D., Bechtel, R., Bennet, J., Clancey, W., Kuikowski, C., Mitchell, T., & Waterman D. A. (1983), Constructing an Experty System, In F. Hayes-Roth, D. A. Waterman, & D. B. Lenat (Eds.), Building Expert Systems, Addison Wesley, pp. 321–326.
Warren, D. H. 1977, "Implementing Prologue: Compiling Predicate Login Programs" (DAI Research Papers Nos. 39 & 40) Dept. of Artificial Intelligence, Univ. of Edinburgh.
Goodman, M. (1989), "CBR in Battle Planning", Case--based Reasoning Workshop, pp. 264–269, Morgan Kaufman.

Primary Examiner—Michael R. Fleming
Assistant Examiner—Stuart Shapiro
Attorney, Agent, or Firm—V. D. Duraiswamy; W. K. Denson-Low

[57] ABSTRACT

A knowledge-based system (10) which combines case-based reasoning, heuristic search and deductive rule application. The resulting inference engine is sensitive to the context of problem solving. The system (10) includes a heuristic searcher (22), a case memory (14), a rule memory (18), a rule applier (26) and a case matcher (24). The rule applier (26) uses stored rules to elaborate on new cases by deriving new features so that it will be closer to selected old cases. The case matcher (24) detects how close selected cases are to the new case and generates a score for the match. The heuristic searcher (22) maintains a plurality of elaborated cases and determines the goodness of each elaborated case, the goodness being a measure of the match between the elaborated case and the selected old case.

13 Claims, 2 Drawing Sheets

MATCHING TECHNIQUE FOR CONTEXT SENSITIVE RULE APPLICATION

CROSS REFERENCE TO RELATED APPLICATION

The present invention contain subject matter which is related to the copending U.S. Pat. No. entitled, "Knowledge Acquisition System and Method", Ser. No. 07/869,401, which is assigned to the same assignee as the present invention.

BACKGROUND OF THE INVENTION

1. Technical Field

This invention relates to knowledge-based systems, and more particularly to a knowledge-based system which combines case-based reasoning, heuristic search, and deductive rule application.

2. Discussion

Knowledge-based systems, such as expert systems, have specialized problem-solving capabilities utilizing the knowledge that underlines human expertise. The field of knowledge engineering is concerned with developing new principles, tools and techniques for utilizing the knowledge of human experts in problem-solving. Knowledge-based methods and systems are useful in many important tasks which do not have tractable algorithmic solutions, such as planning, legal reasoning, medical diagnosis, geological exploration, and military situation analysis. These problems originate in complex social or physical contexts, and generally resist precise description and rigorous analysis.

Current knowledge-based systems generally fall into the category of rule-based or case-based reasoning. In either approach, an important goal is to make the reasoning sensitive to the context of the problem. Both approaches have shortcomings which prevent the realization of this goal. In more detail, current rule-based technology utilizes deductive inference from antecedents to conclusions. One problem with this approach is its inflexibility. For example, in rule-based expert systems, this often leads to one of two problems during knowledge acquisition: 1) antecedents of rules are too specific, which leads to systems that are not broad enough and require additional knowledge acquisition to add more rules, and 2) antecedents that are too general leading to an inability to decide which rules to apply and requiring extra knowledge acquisition to acquire control rules which are difficult for a domain expert to explicate and difficult to maintain once the system has been built. In brief, the current rule-based reasoning approaches are limited to strict, deductive rule application. Two examples of state of the art rule application technologies are the PROLOG compilation (see Warren, D. H. 1977, "Implementing Prologue: Compiling Predicate Login Programs" (DAI Research Papers Nos. 39 & 40) Department of Artificial Intelligence, University of Edinburgh) and the Rete Network Compilation (see Forgy C. L. (1982), Rete: "A Fast Algorithm For The Many Pattern/Many Object Pattern-Matching Problem", *Artificial Intelligence*, 19(1), 17-37).

Nevertheless, as different approaches have been attempted to increase context sensitivity, the efficiency has decreased. In addition to rules which can be learned from an expert, a knowledge engineer must invent a new set of rules (such as control rules) used to sequence through the knowledge. These rules do not relate to the way the expert solves the problem, instead they are concerned with getting the knowledge applied in the right order. For example, one approach would be to first find out from an expert when a rule applies and then use a set of rules which determines when a set of rules apply. Also, when a given rule does apply the system must sequence to another set of rules which apply when those rules apply.

Case-based reasoning methods are generally classified into two types: 1) domain independent, feature-based approaches and 2) domain dependent knowledge-based approaches. Domain independent approaches are easy to apply because all one needs are a set of cases and a case matcher. In these approaches, indexing of case memory allows efficient access but representations are limited to flat features only and is inappropriate for problems requiring structured representations. Flat features are numbers or strings, for which matching metrics are easy and computationally inexpensive. Structured representation specify relationships between features for which matching metrics are difficult to define and computationally expensive. A representative domain independent approach is found Goodman, M. (1989), "CBR in Battle Planning", In *Case-based Reasoning Workshop*, (pp. 264-269), Morgan Kaufman.

In contrast, domain dependent approaches utilize inference rules to help match cases. In domain dependent approaches, special indexing strategies must be created for each new application. This makes the application much more expensive and difficult to maintain. A representative domain dependent approach is described in Bareiss, R. Porter, B. W., and Murray, K.S. (1989), "Supporting Start-To-Finish Development of Knowledge Bases", *Machine Learning*, Vol. 4, (¾), 259-284.

Thus, it would be desirable to provide a knowledge-based system which is both context-sensitive and efficient. Further, it would be desirable to provide a knowledge-based system which avoids the necessity of the control rules required in rule-based expert systems Also, it would be desirable to provide a knowledge-based system which can utilize the advantages of both case-based and rule-based reasoning while minimizing their respective disadvantages. Further, it would be desirable to provide a knowledge-based system in which the cases used are not limited to flat features but can contain structural features. Further, it would be desirable to provide a knowledge-based system which simplifies the knowledge acquisition process.

SUMMARY OF THE INVENTION

Pursuant to the present invention, a method is provided which accomplishes context sensitive rule application to overcome the inflexibility of deductive rule application. The present invention combines case-based reasoning, heuristic search and deductive rule application to create an inference engine where rule firing is sensitive to the context of problem-solving. The heuristic search allows case-based and rule-based reasoning to be used together in a very flexible manner without sacrificing efficiency.

In more detail, in accordance with a first aspect of the present invention, a knowledge-based system comprises a case memory for storing a set of exemplary cases from the domain of the given problem. The case memory contains a plurality of fields, each containing data describing features of the cases. A rule memory is used for storing a set of rules, each rule being associated with one or more stored cases. A heuristic searcher receives data corresponding to some of the fields regarding a new case to be analyzed. The heuristic searcher includes a means for controlling a search of the case and rule memories for cases and rules which relate to the new case. The heuristic search chooses selected cases in the case memory for comparison with the new case. A case matcher is coupled to the heuristic searcher and to the case memory for detecting how close the selected cases are to the new case; it also determines which fields of the new case do not match with the stored cases. A rule applier uses the stored rules to elaborate the new case (by deriving new features) so that it will be closer to one of the selected old cases. The heuristic searcher maintains a plurality of elaborated cases and determines the goodness of each elaborated case, where goodness is measured by the match between elaborated case and the selected old case.

In accordance with a second aspect of the present invention, a method is provided for solving problems which present a set of known and a set of unknown parameters. The method includes the steps of receiving a set of known parameters and storing a set of previous cases from a domain related to the problem. Also, a set of rules which apply to the cases are stored. Next, the system determines which of the stored cases most resembles the known parameters in the problem and determines which of the stored rules apply to the set of stored cases. The system then elaborates the problem to be solved by inserting values for the unknown parameters which will make it more like one of the cases in this stored set. In this way, a plurality of elaborated cases are created. Next, a heuristic search is performed on the elaborated cases to determine a goodness measure of the elaborated cases. Finally, the system chooses a best elaborated case based on the heuristic search. The result is an efficient context-sensitive knowledge-based system.

BRIEF DESCRIPTION OF THE DRAWINGS

The various advantages of the present invention will be come apparent to those skilled in the art by reading the following specification and by reference to the following drawings in which.

DETAILED DESCRIPTION OF THE INVENTION

The present invention is a knowledge based system which accomplishes context sensitive rule application. It overcomes the inflexibility of conventional deductive rule application systems. This is done by combining case-based reasoning, heuristic search, and deductive rule application. The result is an inference engine where rule firing is sensitive to the context of problem solving. The present invention is especially applicable to knowledge application because experts are generally poor at explicating context sensitive rules, but are good at generating example cases of problem solving. The invention uses heuristic search to efficiently access a case memory. The cases are used to facilitate flexible, context sensitive application of the rules.

Figure 1:
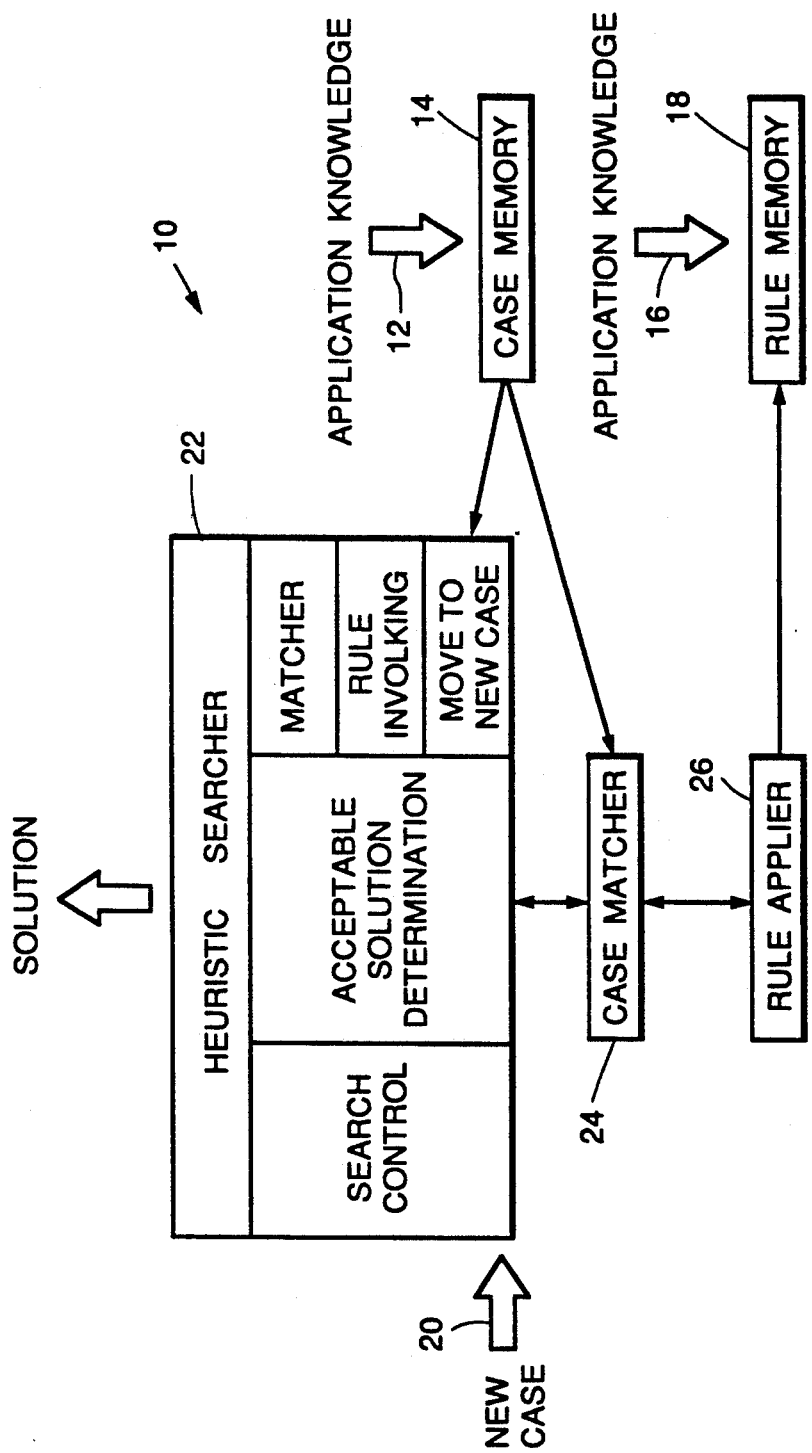
FIG. 1 is a top level organizational block diagram of the case-based heuristic rule application system in accordance with the present invention.

Referring now to FIG. 1, an overall diagram of a knowledge based system 10 in accordance with the present invention is shown. Before using this system 10, two types of application knowledge is stored. First, application knowledge containing previous relevant cases 12 is stored in a case memory 14. The case memory contains exemplars, or cases, that an expert (a person knowledgeable in a domain) considers important for understanding how to solve problems in that domain. Exemplars may also be referred to as paradigm cases, pedagogic examples or prototypes. The exemplar cases are composed of features or parameters describing the case.

Second, application knowledge in the form of general rules 16 is stored in a rule memory 18. This form of knowledge acquisition is simpler than the conventional technique where an expert will provide rules as well as the context knowledge for when these rules apply. That is, in the present invention, the expert provides previous cases for case memory as well as general rules for the rule memory but does not have to specify exactly how to apply these rules. The expert merely has to specify which rule was used in particular cases. Associating rules with cases is an easier process during knowledge acquisition than specifying how rules are applied.

Once the cases and rules have been stored in the case memory 14 and rule memory 18, the system 10 is ready to receive a new case 20. The new case, may comprise a structured set of information or features about the problem to be solved. For example, if the problem is a design problem there may be 50 or so feature parameters which define the problem. Cases stored in case memory 14 may contain all of these 50 parameters about known cases. However, the new case 20 may contain perhaps only half of the 50 parameters. Therefore, the task of the system 10 is to solve the new case by filling in the missing parameters utilizing previous cases and rules stored in the case memory 14 and rule memory 18.

The rules in the rule memory 18 are organized into sets and rule sets are associated with exemplars. The nature of the association between rule sets and exemplars is defined by a hierarchical tree structure which will be described in more detail below.

Initially, the new case 20 parameters are received by a heuristic searcher unit 22. The heuristic searcher 22 compares the new case and selects some of the cases in case memory 14 which have similarities to the new case. These cases are selected by the match goodness of those features that are present in the new case. Prototypes that match well on the features present are selected first. It gives these cases, as well as the new case features, to a case matcher 24. The case matcher 24 determines how close the input case is to each of the cases provided and gives a point match for each feature.

In particular, the case matcher 24 takes the partial case match given by the heuristic searcher 22 and two features, one from an exemplar and one from the new case and gives a new partial case match. The case matcher 24 in addition to yielding a score for the match of these two features, also determines any new token correspondences that are engendered by matching the two features. Token correspondences are the associations between structured features of the new case and a prototype and will be described in more detail below.

The heuristic searcher 22 maintains the state of the current memory search. In the preferred embodiment, the heuristic search uses a beam search mechanism. The states of the heuristic search are partial case matches. The heuristic searcher 22 has three operators, 1) matching individual predicates between an exemplar and a new case, 2) invoking rules to derive a feature that is present on an exemplar but a missing feature on a new case, and 3) moving to a new exemplar.

Once the case matcher 24 determines the score and the missing items between the new case and the exemplar, the heuristic searcher 22 commands the case matcher to apply some rules to attempt to derive some of these missing features. This is done using a rule applier 26. The rule applier 26 takes as its main inputs three pieces of information: 1) a new case, 2) the name of a predicate to be derived (along with the number of arguments), and 3) a description of which rule sets to use. The rule applier also takes, as auxiliary inputs, information that describes the amount of computational effort to be spent. In the preferred embodiment, the rule applier 26 is implemented using a stack-based backward chaining inference engine such as PROLOG. It will be appreciated that PROLOG is) an efficient form of a rule application when the name of the predicate desired is known. It is available from Quintus Corporation, Los Angeles, Calif. In response to commands from the heuristic searcher 22 and case matcher 24, the rule applier 26 will acquire the relevant rules from the rule memory to derive new features to fill in the missing features. Note that since rules are associated with exemplars in the case memory 14, for each exemplar being operated on by the case matcher, there will be a set of associated rules in the rule memory 18.

The rule matcher will then choose the features derived by the rule applier which are closest to the current cases that are being analyzed. This process of deriving new features is referred to as "elaborating" the new case 20, which is an attempt to make it look more like one or more old cases. The heuristic searcher 22 maintains several hypotheses of what exemplar is being matched and determines a "goodness" metric for the matches. The "goodness" metric is a number which indicates the closeness of the match: the higher the number, the closer the match. That is, the heuristic searcher 22 keeps track of multiple avenues of exploration in terms of matching the new case with exemplar cases. This goodness is a measure of the closeness of the elaborated cases with the old case. During the process of elaboration, the heuristic searcher 22 attempts to cause as few changes as possible to be made during elaboration to produce matches between old cases and elaborated new cases.

A number of advantages result from this technique. In conventional case based reasoning systems (in contrast to the present invention), old cases would be retrieved and the old cases would be modified to attempt to make them conform with a new case. However, it appears to be fundamentally more difficult for an expert to formulate rules for modifying the designs of old cases than to simply identify fundamental principles of operation, such as those stored in the rule memory 18, and a number of exemplars of cases known to have worked in the past. Thus, elaboration of the new case is a more powerful method than modifying the old case.

Also, in prior case-based reasoning systems, complicated rule structures called control rules had to be written to test the context etc., whereas in the present invention the effect of considering the context is achieved by interleaving the case matching and rule application because the system is only applying rules that are known to have worked in a similar context.

Figure 2:
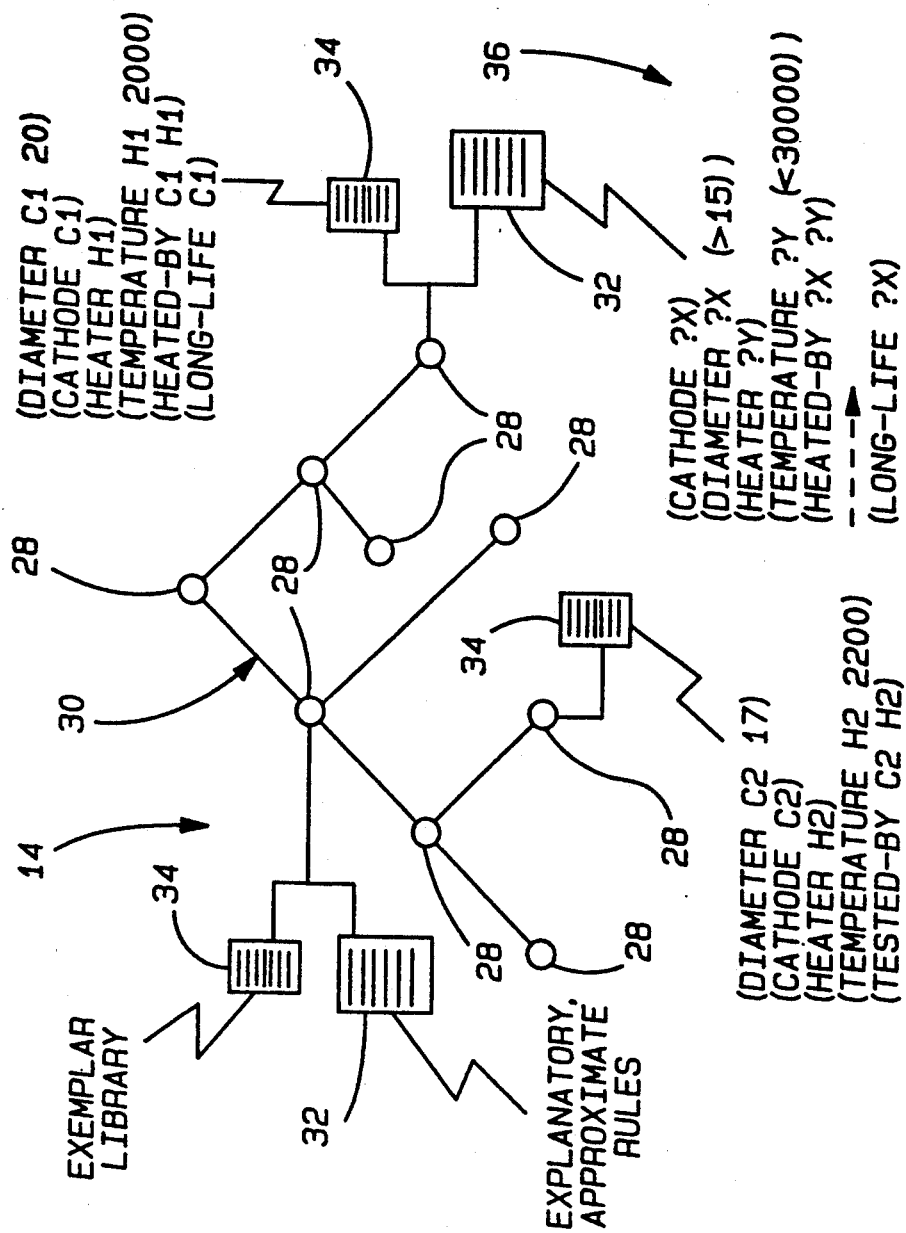
FIG. 2 is a diagram of a case memory in accordance with a preferred embodiment of the present invention.

Referring now to FIG. 2, there is shown a diagram of one embodiment of a case memory 14 in accordance with the present invention. The case memory 14 includes a plurality of nodes 28 which are arranged in a tree structure 30. Each node represents a category of the given problem, and the tree structure 30 defines the hierarchy of these categories. Thus, all of the nodes below a given node in the tree represent subcategories. Each node in the tree 30 has associated rules 32 and exemplars 34. In the hierarchical organization of the tree 30, the top most node 28 represents the broad category of design specifications for traveling wave tubes. Nodes below may all represent various categories of these specifications and design requirements. The rules 32 are only applied when matching a case at the same node as the rule, or at a node below it. That is, each node inherits the rules of all of the nodes above it on the hierarchy of the tree 30. For example, the rule 36 which deals with how a cathode is heated would not be applied when trying to match the case in the lower left of FIG. 2 where the heater is testing the cathode.

It should be noted that the rules 32 depicted in FIG. 2 are there for illustration purposes and, in fact, actually reside in rule memory 18. However, in rule memory 18 the identical tree hierarchy 30 would exist, with rules placed at nodes as illustrated in FIG. 2. In this way, rules are associated with exemplars by their position on the hierarchy. Also, rule sets (discussed above) in this embodiment may be defined as those set of rules which fall under the same general rule at a particular node in the hierarchy. One way to use the present invention is to have rules derive conclusions; another way is to put in the requirements and to have the system find previous designs that meet the requirements.

It should also be noted that the exemplars 34 and rules 32 as shown in FIG. 2 are written in a syntax which is English-like, thus permitting an expert who is a non-programmer to easily read and understand the symbolic representations. This makes the process of testing and debugging easier.

Using the above example, the operator of the case matcher to the example in FIG. 2 will be discussed. The case matcher 24 may be understood as a state space search problem. It will be appreciated that, in general, state space search problems have two components: states and operators. The states form a set, $S = [s_i]$.

For example, in chess, the state space is all possible configurations of pieces. The operators also form a set, $O = [o_j o]$.

For some problems, the set of states or operators may be infinite. State space searches are generally expressed as trees. Typically, the steps or operators along paths in the tree from a starting point to a target point, each involve a cost. The state-based search typically involves searching through the tree structure to find a solution which reaches the target with a minimum cost. There are two ways of exhaustively searching a tree, breadth first and depth first. In depth first, the process begins with a start state, and then goes down a path until it reaches either the goal or can move no further. In breadth first search, at each iteration all active nodes are expanded.

However, these strategies alone are not good for the path planning example because the notion of cost is not included and the solution identified by the search may not be the best solution or even a good solution. The most common search technique for problems where cost is a consideration is "best first search". This search technique is similar to breadth first, but only one node in the active set is expanded at each time. If some criteria for "good enough" can be defined, breadth first search can be biased toward better solutions and then terminated when a solution is found.

Beam search is a best first search technique which limits the number of nodes in the active set. The node number limit is called the "beam width". Beam search has an advantage over best first search in that the amount of memory used is limited. For highly combinatoric domains such as chess, the active set can reach many millions of nodes. With beam search a limit, for example, 10, may be set. The penalty is that the beam may be so narrow that it misses a good solution. The three operators in the search are, as discussed above, 1) matching individual predicates between an exemplar and a new case, 2) invoking rules to derive a feature that is present on an exemplar but missing on a new case, and 3) moving to a new exemplar.

In the example shown in FIG. 2, for matching a new case against the case memory, the state is composed of:
 (a) the node in the case memory,
 (b) an exemplar,
 (c) features placed in correspondence, and
 (d) tokens placed in correspondence.
Consider a new case with the following features:
 (diameter c3 12)
 (cathode c3)
 (heater h3)
 (temperature h3 2100)
 (heated-by c3 h3)
During the case matching process, the system might reach a state as follows:
 (a) at the lower right-hand node
 (b) at the exemplar with "C1 and H1"
 (c) feature correspondence
  (diameter c3 12)=(0.2)  (diameter c1 20)
  (temperature h3 2100)=(0.8)  (temperature h1 2000)
  (cathode c3)=(1.0)  (cathode c1)
  (heater h3)=(1.0)  (heater h1)
  (heated-by c3 h3))=?
  ?=(heated-by c1 h1)
  ?=(long-life c1)
 (d) token correspondence
  c3=c1
  h3=h1
In the above description, the feature by feature match score is given in parentheses next to the "=". The match scores are derived by user supplied knowledge as to the minimum and maximum value for a parameter. In the example above, the minimum and maximum for diameter are 10 and 20 respectively. Therefore, the 0.2 score is derived as follows:

$$score = (1.0 - |new - old|/(max - min))$$

$$0.2 = (1.0 - |12 - 20|/(20 - 10))$$

This computation results in a match score of 1.0 for exact matches and a 0.0 match score for the min and max. The underlined assignments indicate that the next operator likely to be selected will be to put the features
 (heated-by c3 h3)=? and
 ?=(heated-by c1 h1)
into correspondence.

The combination of all the feature scores is the goodness for that node. In the present invention a weighted average is used for this combination. However, other combination schemes may be used. The treatment of "?" on one side or the other of feature assignments can vary. One example is shown below.

The operators in this case are things that might change the state. For example, the system could do any one of the following:
 1) move to a new node in the tree, or
 2) start a new exemplar at the current node, or
 3) run a rule on the new case to derive some new features, or
 4) place two features (one from the old and one from the new) into correspondence.

In the state given above, the best operator to apply would be number 4, that is, to make the following feature correspondence assignment:
 (heated-by c3 h3)=(1.0)
 (heated-by c1 h1)
The assignment would delete the underlined assignments above.

The choice of which operator to apply at any given state is determined by the heuristic searcher 22. In more detail, the heuristic searcher 22 attempts all reasonable operators. It does not, however, attempt operators that will obviously decrease the goodness. After the operators are applied, the beam is formed by keeping only the N best hypotheses (where N is the beam width).

A preferred method for gathering exemplars from an expert is to use the knowledge acquisition method described in the above cross-referenced patent application entitled "Knowledge Acquisition System and Method". However, the matching techniques of the present invention can also be used without that method, for example, by using historical data for exemplars.

From the foregoing, it can be appreciated that the present invention provides a system and method for performing context sensitive rule application which simplifies the knowledge acquisition process and combines both case-based and rule-based reasoning. Those skilled in the art can appreciate that other advantages can be obtained from the use of this invention and that modification may be made without departing from the true spirit of the invention after studying the specification, drawings and following claims.

What is claimed:

1. A knowledge-based system for solving a problem in a given domain, said knowledge-based system comprising:
 case memory means for storing a set of exemplary cases from said domain, said case memory means containing a plurality of fields, each field containing data describing features of said exemplary cases;
 rule memory means for storing a set of rules, each rule associated with one or more stored exemplary cases;
 heuristic search means for receiving a new case comprising a plurality of fields, each field containing data describing features of said problem to be solved, said heuristic search means including means for controlling a search of said case memory means and rule memory means for cases and rules which relate to said new case, said means for controlling a search choosing selected exemplary cases in said case memory means for comparison with said new case;

case matcher means, coupled to said heuristic search means and to said case memory means for determining how close the selected exemplary cases are to the new case, and for determining which fields of said new case do not match with said stored exemplary cases; and rule applier means for using said set of rules to elaborate the new case by deriving new features and creating an elaborated new case, so that the elaborated new case will be closer to one of the selected exemplary cases;

wherein said heuristic search means is coupled to said rule applier means, said heuristic search means maintaining a plurality of elaborated new cases and determining a goodness metric for each elaborated new case, wherein the goodness metric is measured by the match between the elaborated new case and said selected exemplary cases, wherein said heuristic search means includes a means coupled to said means for controlling a search for determining when an elaborated new case represents an acceptable solution to said problem based on said goodness metric.

2. The system of claim 1 wherein said case matcher means determines a partial case match by comparing how close two features are, one feature being from a stored exemplary case and one feature being from the new case.

3. The system of claim 2 wherein said case matcher means determines a score for the partial case match of the two features and any new token correspondences engendered by matching the two features.

4. The system of claim 1 wherein said heuristic search means comprises a beam search means for performing a beam search.

5. The system of claim 1 wherein said heuristic search means, contains at least three operators including 1) means for matching individual predicates contained in both an exemplary case and a new case, 2) means for invoking rules in said rule memory means to derive a feature that is present on a stored exemplary case but missing on a new case, and 3) means for moving to a new stored exemplary case.

6. The system of claim 1 wherein said rule applier means receives as input from said heuristic search means said new case, the name of a predicate to be derived along with the number of arguments, and a description of which rule sets to apply.

7. The system of claim 6 wherein said rule applier means also receives as input from said heuristic search means information describing the amount of computational effort to be spent.

8. The system of claim 6 wherein said rule applier means includes a stack-based backward chaining inference engine.

9. A method for solving problems which present a set of known and a set of unknown parameters, said method comprising the steps of:
receiving a set of known parameters of said problem;
storing a set of previous cases representing solutions from a domain related to said problem;
storing a set of rules which apply to said previous cases;
determining which of said stored previous cases most resembles said known parameters in said problem;
determining which rules of said stored set of rules apply to said set of stored previous cases;
elaborating said problem of known parameters by inserting values for said unknown parameters which will make said problem more like one of said cases in said set of stored previous cases, to create a plurality of elaborated cases;
performing a heuristic search on said elaborated cases to determine a goodness measure of said elaborated cases;
choosing a best elaborated case based on said heuristic search; and
determining when an elaborated case represents an acceptable solution to said problem based on said goodness measure.

10. The method of claim 9 wherein said step of performing a heuristic search further comprises the step of determining a partial match based on two features, one feature from a previous case and one feature from said problem.

11. The method of claim 10 wherein said step of performing a heuristic search further comprises the step of determining a score for said partial match of said two features and determining new token correspondences engendered by said partial match.

12. The system of claim 9 wherein said step of performing a heuristic search performs a search which is a beam search.

13. A knowledge-based system for solving a problem in a given domain, said knowledge-based system comprising:
case memory means for storing a set of exemplary cases from said domain, said case memory means containing a plurality of fields, each filed containing data describing features of said exemplary cases;
rule memory means for storing a set of rules, each rule associated with one or more stored exemplary cases;
heuristic search means for receiving a new case comprising a plurality of fields, each field containing data describing features of said problem to be solved, said heuristic search means including means for controlling a search of said case memory means and rule memory means for cases and rules which relate to said new case, said means for controlling a search choosing selected exemplary cases in said case memory means for comparison with said new case, said heuristic search means containing at least three operators including (1) means for matching individual predicates contained in both an exemplary case and a new case, (2) means for invoking rules in said rule memory means to derive a feature that is present on a stored exemplary case but missing on a new case and (3) means for moving to a new stored exemplary case;
case matcher means, coupled to said heuristic search means and to said case memory means for determining how close the selected exemplary cases are to the new case, and for determining which fields of said new case do not match with said stored exemplary cases, said case matcher means determining a partial case match based on two features, one feature from a stored exemplary case and one feature from said new case; and
rule applier means for using said set of rules to elaborate the new case by deriving new features of the new case and creating an elaborated new case so that the elaborated new case will be closer to one of the selected exemplary cases;

wherein said heuristic search means maintains a plurality of elaborated new cases, and determines a goodness metric for each elaborated new case, wherein the goodness metric is measured by the match between the elaborated new case and said selected exemplary cases, wherein said heuristic search means includes a means coupled to said means for controlling a search for determining when an elaborated new case represents an acceptable solution to said problem based on said goodness metric.

* * * * *